Aug. 13, 1946.  A. M. ROWLAND  2,405,757
PIPE WRENCH
Filed April 30, 1941  7 Sheets—Sheet 1
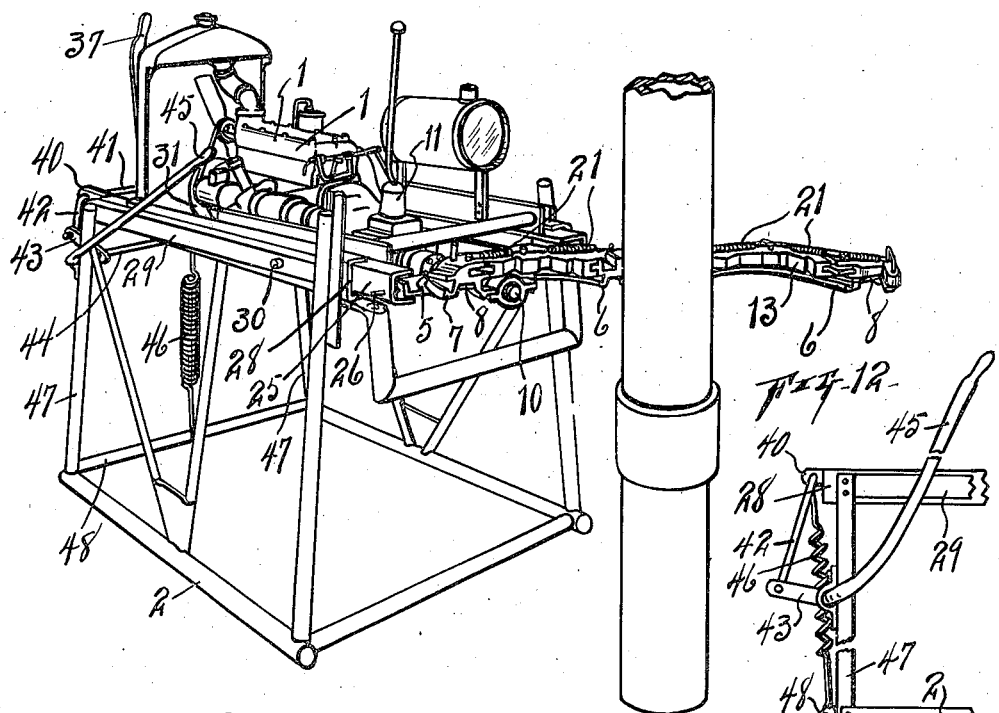
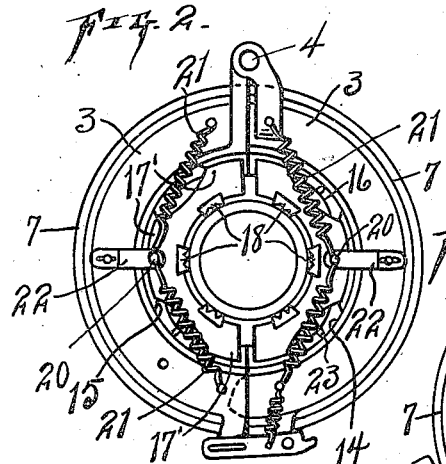
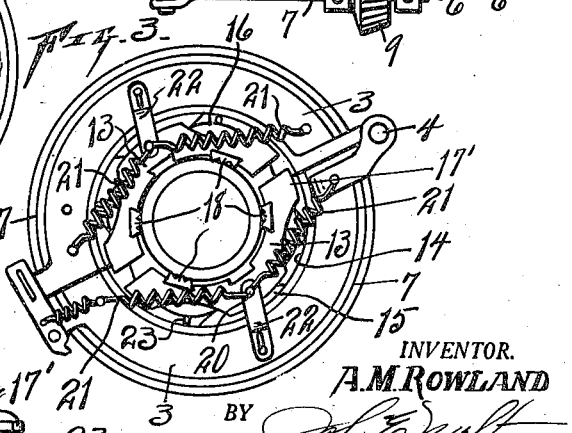
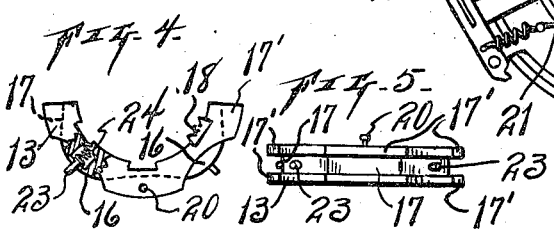
INVENTOR.
A. M. ROWLAND
BY
ATTORNEY.

Aug. 13, 1946.  A. M. ROWLAND  2,405,757
PIPE WRENCH
Filed April 30, 1941  7 Sheets-Sheet 2
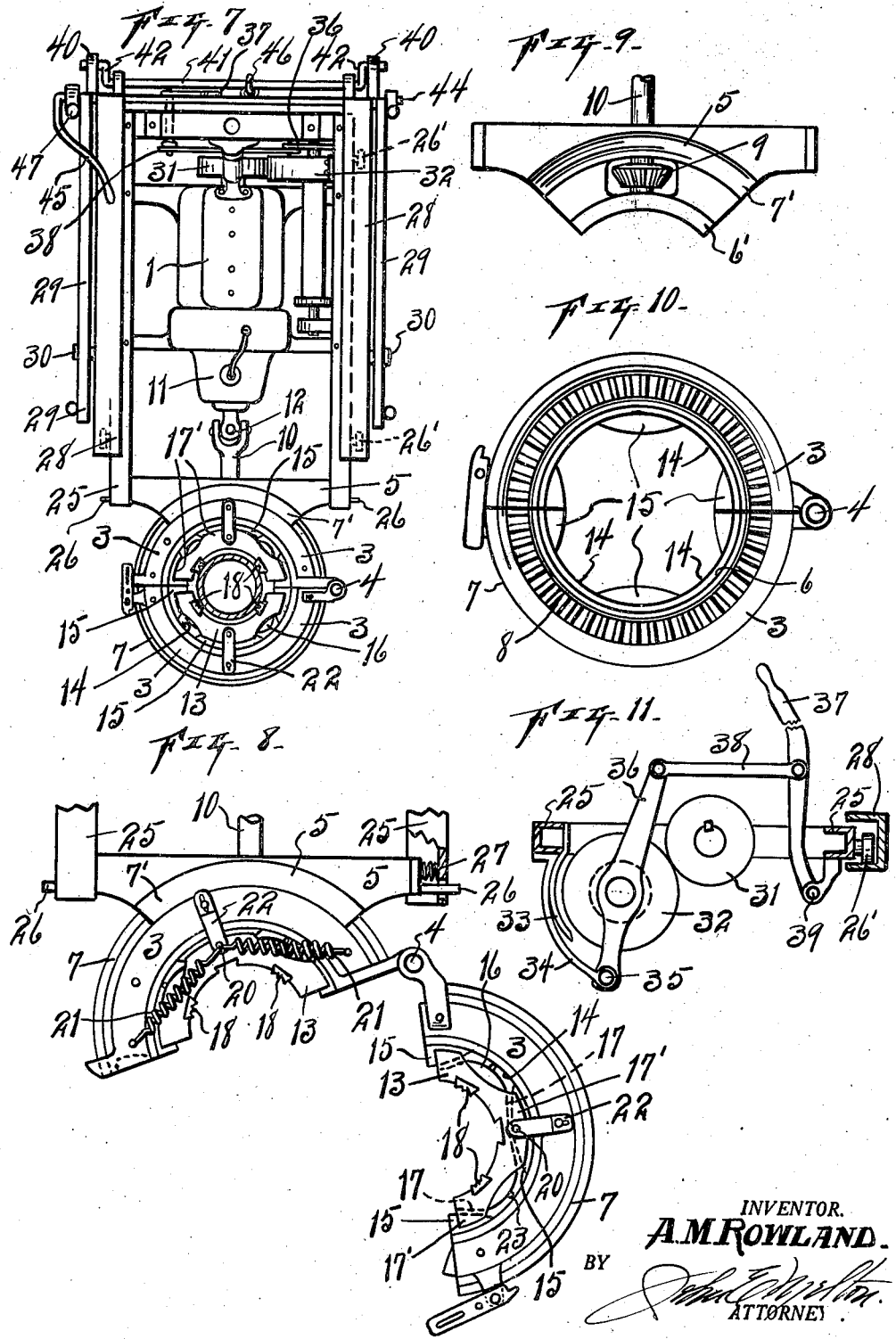
INVENTOR.
A. M. ROWLAND
BY
ATTORNEY

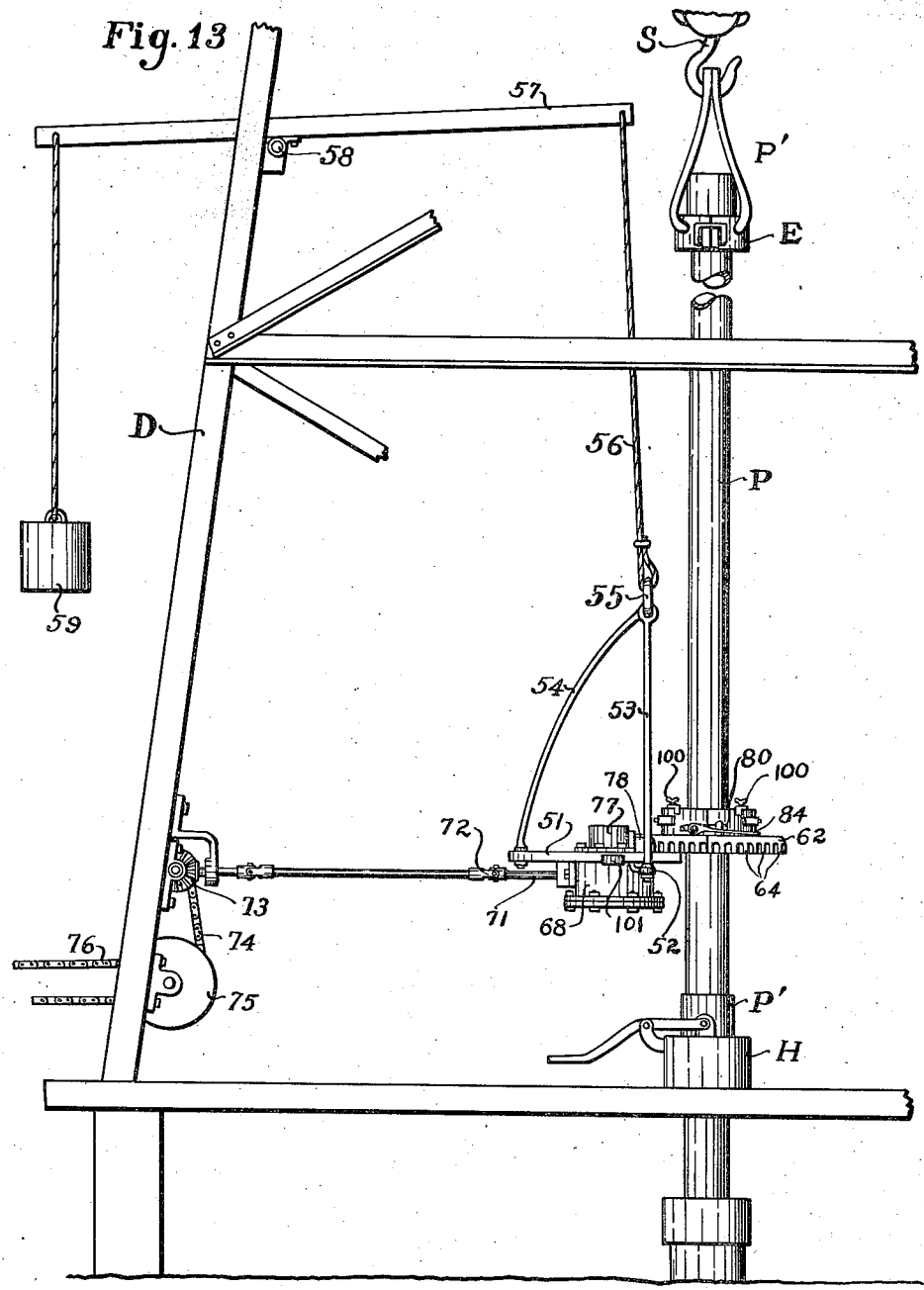

Aug. 13, 1946.　　　A. M. ROWLAND　　　2,405,757
PIPE WRENCH
Filed April 30, 1941　　　7 Sheets-Sheet 4

Arthur M. Rowland
INVENTOR.
BY
ATTORNEY.

Arthur M. Rowland
INVENTOR.

Aug. 13, 1946.   A. M. ROWLAND   2,405,757
PIPE WRENCH
Filed April 30, 1941   7 Sheets-Sheet 7
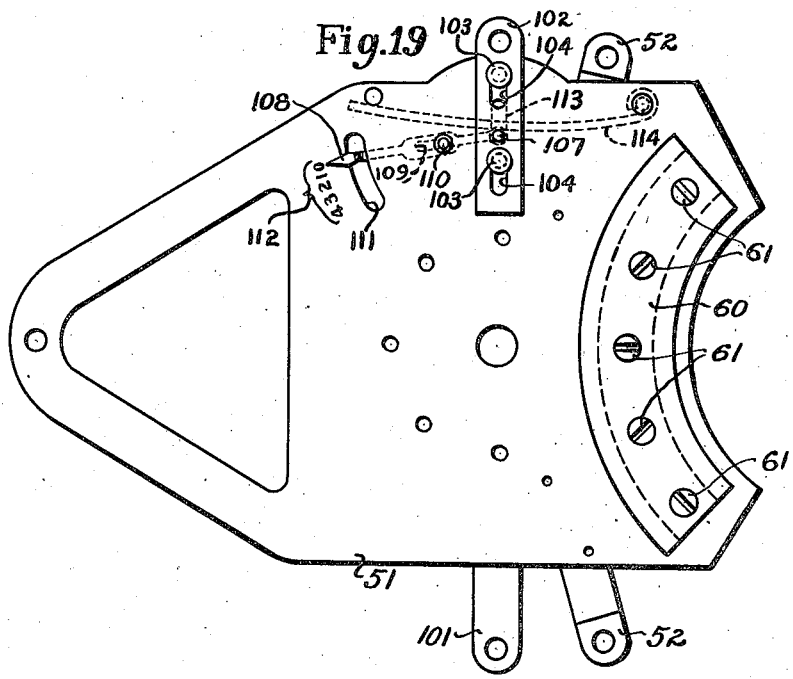
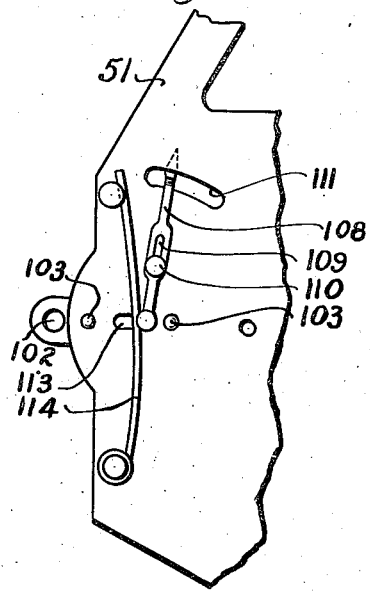
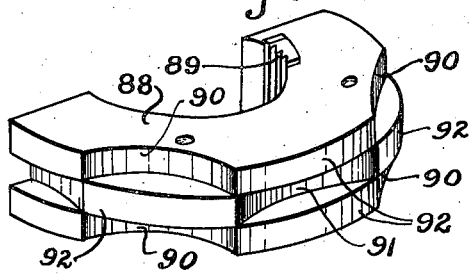
Arthur M. Rowland
INVENTOR.

Patented Aug. 13, 1946

2,405,757

UNITED STATES PATENT OFFICE 2,405,757

PIPE WRENCH

Arthur M. Rowland, Graham, Tex.

Substituted for application Serial No. 161,713, August 30, 1937. This application April 30, 1941, Serial No. 391,192

10 Claims. (Cl. 255—35)

This invention relates to an improvement in pipe wrenches, and more particularly to wrench devices designed for rotating pipe joints for joining together or disconnecting pipe sections, such as may be used in making up a pipe or in pulling the pipe from a well.

Heretofore, the screwing together and the unscrewing of pipe sections of well pipe, has in each instance been very laborious, usually being accomplished manually, or when provision is made for operating the same by power, such devices have been so heavy and cumbersome as to be highly objectionable, expensive, and difficult of transportation from place to place where their use may be required.

It has been suggested that the rotary table of a rotary type drilling rig may be used to turn the lower portion of the drill pipe while the upper section is held stationary, to screw together or uncouple the pipe sections. However, when the lower portion of the pipe is stuck in the well, it is impossible to rotate it for disconnecting the pipe sections. Furthermore, it is frequently dangerous to rotate the portion of the drill pipe that is in the well, especially when it is turned in a direction to unscrew it from other parts below the rotary table.

The object of this invention is to simplify and improve a device for screwing together or unscrewing pipe sections, to construct the same light in weight, capable of being transported easily to the desired point of use, and yet be so constructed as to be inexpensive, simple in construction and operation, but at the same time provide effective means for coupling and uncoupling pipe sections.

In carrying out this object, I construct the device as a unit capable of being supported either on an independent frame or suspended by a cable, and having provision for being applied to a drill pipe section in gripping engagement therewith substantially in the form of a rotary table which has power driving means connected therewith capable of turning the same to connect or disconnect the pipe sections.

I have shown different embodiments of the invention in the accompanying drawings, in which:

Fig. 1 is a perspective view of one form of the machine, shown with the pipe or rod engaging unit open and in position where it may be moved to engage a pipe of a well;

Fig. 2 is a plan view of the pipe engaging unit, shown in engagement with a pipe;

Fig. 3 is a similar view, showing the action of the internal mechanism of the engaging unit when the same is rotated clockwise;

Fig. 4 is a plan view, partly in section, of one of the members of the unit that is adapted to contact the pipe;

Fig. 5 is a side elevation of the same;

Fig. 6 is a detail sectional view of a portion of the pipe engaging unit, illustrating the drive and rotatable support of the same;

Fig. 7 is a plan view of the machine;

Fig. 8 is a plan view of the pipe engaging unit, showing the same in an open position and the springs omitted from one sector;

Fig. 9 is a plan view of the track for the unit;

Fig. 10 is an inverted plan view of the sectors of the pipe engaging unit, shown with the inner members omitted;

Fig. 11 is a detail sectional view of the drum operating means for picking up pipe and other drilling units;

Fig. 12 is a detail side elevation of the frame structure showing manual means of control;

Fig. 13 is a side elevation of another form of the device as installed on a derrick;

Fig. 19 is a detail plan view of the base plate structure, showing the torsion indicating device;

Fig. 20 is a detail bottom plan view thereof; and

Fig. 21 is a detached perspective view of a pipe gripping segment.

Figure 14:
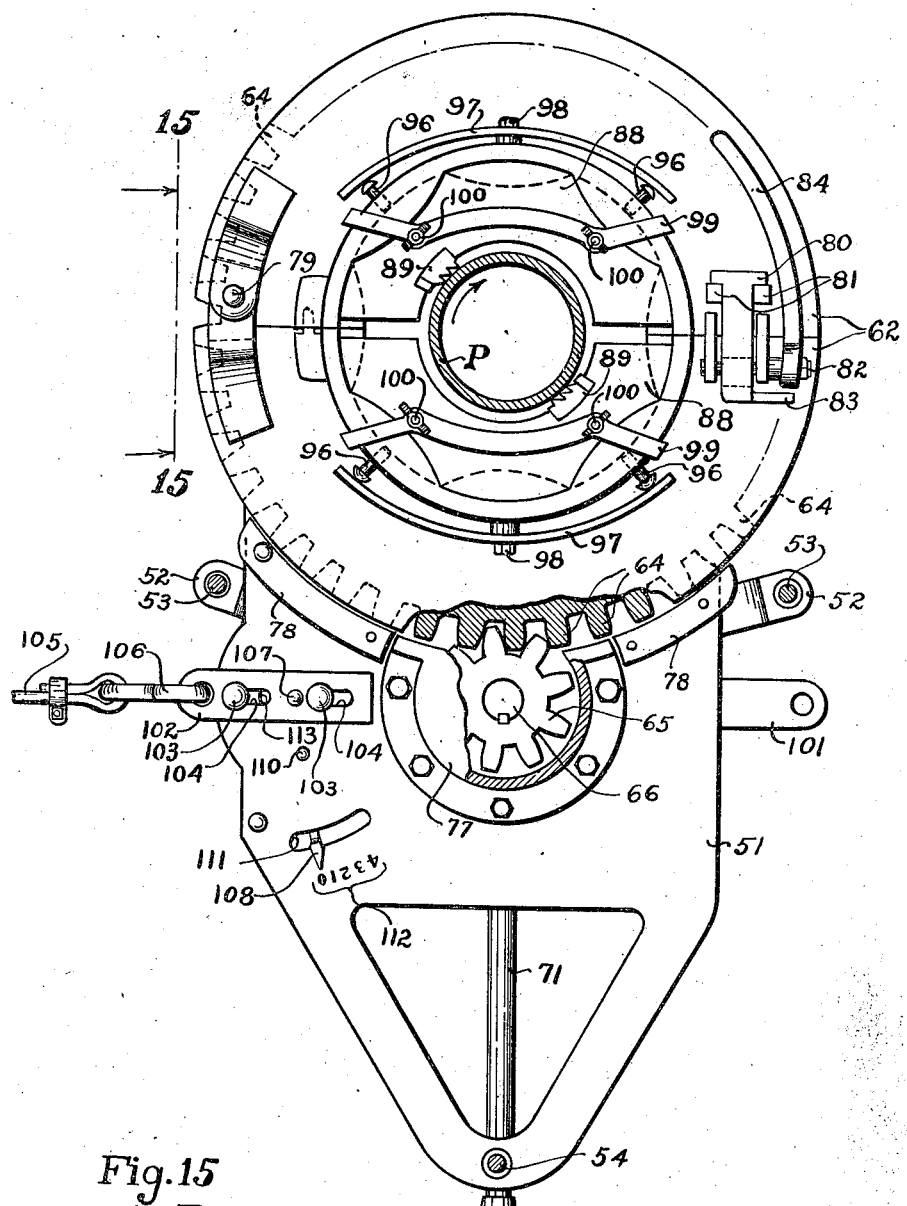
Fig. 14 is a top plan view of the wrench device applied to a joint of pipe, with parts broken away and in section.

Different embodiments of the invention are shown respectively in Figs. 1 to 12, and 13 to 21, of which, that shown in Figs. 1 to 12 corresponds with the disclosure of my prior application Ser. No. 161,713, filed August 30, 1937, for which this application is substituted.

This mechanism, according to the form shown in Figs. 1 to 12, includes a motor 1 which is mounted on a frame 2 and adapted to rotate a unit which is adapted to have frictional engagement with the outer periphery of a pipe, rod, or other element, especially those used in the drilling and servicing of wells.

The pipe engaging unit consists of a rotary table or collar 3 which is formed in semi-circular units or sections that are hinged together by means of a hinge 4 and adapted to form a collar around a pipe. One of the faces of this collar 3 is formed with integral concentric V-shaped extensions 6 and 7 which are adapted to fit into a sector of a track 5. The object of these extensions 6 and 7 and the track 5 is to support and journal the collar 3 so that it may be rotated by the motor 1. Intermediate these V-shaped extensions 6 and 7 is a relatively wide groove which is cut with gear teeth 8, that are adapted to be meshed with and driven by a pinion 9.

The pinion 9 is journaled in the body of the track 5 and adapted to be driven by the motor 1. The pinion 9 is keyed or otherwise secured to an axle or drive shaft 10 which is in operative connection with the transmission 11 of the motor. A universal joint 12 is provided in the axle 10 so that the track 5 and its pinion 9 may have a universal movement relative to the motor 1 and its immediate frame.

The inner periphery of the collar 3 is adapted to carry loosely mounted sectors or segments 13 which are adapted to engage the outer periphery of the object to be handled by the mechanism. These sectors 13 are so mounted in the inner periphery of the collar 3, that when the collar 3 is rotated in either direction while the object tends to hold the sectors stationary, they will be wedged against the object they engage. This movement of the sectors 13 relative to the body of collar 3 is attained by forming the inner periphery of the collar member 3 with a plurality of cam shaped grooves 14 and projections 15 which are adapted to engage and cooperate with a plurality of projections and grooves 16 and 17, respectively, of the sectors 13, which projections have arcuate inner edges and coact with the arcuate inner edges of the grooves to provide cam actions therebetween upon relative rotation of the parts. The outer peripheries of the sectors 13 are grooved to receive the projections 15 of the collar member 3, and provided with extensions or cam shaped projections which are adapted to project into the internal grooves 14 of the collar member 3. The grooves and extensions of the members 3 and 13 serve to hold the sectors 13 in concentric relation with the collar 3 and also to vary the radial movement of the sectors 13 relative to the member 3.

In this instance, a sector 13 is operatively carried in each of the two sections of the member 3 and these two sectors are provided with toothed inserts 18 which contact with the outer periphery of a pipe to be handled. When the sectors are provided with the inserts 18, these inserts may be removed and interchanged with sectors of different sizes to adapt the device to pipe of various diameters.

It is desirable that each sector 13 have sufficient freedom of movement, relative to the member 3, so that the member 3 may be forced in its rotation, with sudden jerks against the inertia of the pipe, in order to "break" the threads loose and permit unscrewing of tight pipes. This is more readily accomplished by providing means for balancing or resiliently holding the members 13 so that they may receive the full effect of the cam action, each time the member is jerked rotatably against the pipe. The balancing of the sectors 13 is accomplished by means of springs which hold each sector in an approximate central position within the inner arcuate opening of the member 3, that is, the ends of each sector 13 are in approximate alignment with the ends of its respective unit 3.

The face of each sector 13 is provided with a bolt or pin 20, which is positioned midway between the ends of the sector, and this bolt serves to anchor the ends of two coil springs 21, and is also adapted to pass through the end of a bar 22. The bar 22 extends radially from the sector 13, and is adapted to have a loose connection with the face of the member 3, so that it will not affect the movement of the sector 13, caused by the cam members 14 to 17 inclusive. The other ends of the coil springs 21 are secured to the face of the member 3, one adjacent one end of the semi-circular portion of the member 3, and the other adjacent the other end of the same. The tension of these springs 21 holds each sector 13, so that its ends will be in radial alignment with the ends of the corresponding section of the member 3.

When the member 3 is started in its rotation by the motor 1, the tension of the sectors 13, and their inserts 18 against the pipe, will permit the member 3 to move a slight portion of its rotation before the cam action takes effect, against the tension of the springs 21, and moves the sectors 13 and the pipe that it engages. The extent of cam action will be governed to a certain extent by the amount of rotatable resistance that is offered by the pipe engaged.

In order for the sectors 13, and their inserts 18, to have tension at all times against the pipe engaged, a plunger 23 is operatively positioned in the outer periphery of each sector 13, and adapted to have tension against the inner periphery of the member 3. This plunger 23 is inserted into an opening in the sector 13, so that it will bear against a spring 24, which tends to push the plunger against the inner periphery of the member 3, and holds the inserts 18 with sufficient tension against the pipe to be handled.

An advantage of the springs 21 is that: when all rotatable tension is removed from the pipe engaged by the sectors 13, the sectors will move to a position where they will offer a minimum resistance in opening the collar and releasing the pipe. The member 3, which is formed similar to a collar, is cut in two equal sectors which are pivotally connected together at 4. When these two sectors are closed so that they encompass a pipe, they are locked in such a manner as to permit the motor 1 to rotate them in either direction. This locking means may be of any desirable form, but is shown in this form of the invention, of a spring form, which is positive and which will not release when it is moved within the field of the collar supporting member 5.

A desirable manner of using this type of pipe or rod engaging collar 3, is to provide a flexible means for driving the same so that it may have the least amount of pressure and resistance to a pipe when the pipe is being threaded into a coupling. The motor installation, as shown, permits the operator to control the collar 3, in speed and direction of travel, throughout its universal movements. It is apparent that the motive power may be remote from the machine proper and the collar 3, may be actuated and controlled as a separate unit, but in order to have a compact and complete portable unit, it is preferable to support the motor 1 and to journal the collar track 5 in a cradle or frame 25, which is adapted to reciprocate and to swing on the main frame 2. The frame 25, consists of two parallel side members or channel irons which are positioned longitudinally of the axis of the motor. The ends of the track member 5 are formed so that they extend into the ends of these channel irons and be held therein in a loose manner. A bolt 26 projects in the form of studs from the opposite ends of the track member 5, which studs are loosely mounted in the frame 25 and pivotally support the track 5 therein. A coil spring 27 may be interposed between each end of the member 5, and the inner wall of the channel member of the frame 25, so as to permit the track 5, and its collar 3 to have sufficient play or movement to accommodate the load or job.

A second channel iron frame member 28 is positioned parallel with and around the channel irons of the frame 25. The frame members 25, are each provided with a plurality of rollers 26' which are adapted to roll in the channels 28. This arrangement permits the motor 1, to reciprocate relative to the pipe to be handled, permitting the motor and its collar 3, to be moved to or from the pipe. The members 28, are pivotally connected to the horizontal frame members 29, of the main frame 2, by pivotal connections 30. This arrangement permits the operator of the device to adjust the positions of the motor and its collar 3 simultaneously and to reciprocate the same in the frame 2, thus giving universal action to the pipe engaging unit 3, and its motive power.

The end of the crank shaft of the motor 1, opposite the transmission 11, may be provided with an idler 31, which is adapted to have frictional engagement with and drive a drum 32 (Fig. 11). This drum 32 is movably journaled in the frame 25, and adapted to be actuated either to engage the idler or drive wheel 31, or to be moved into contact with a fixed brake band 33, which is also supported on the frame 25. This drum 32 may be used for picking up joints or other units that are being handled by the collar 3.

The advantage of the universal movement of the engaging unit 3, is that it will travel with the object that it engages during rotation of the same. This permits use of the mechanism for rotary drilling, pumping, plugging wells without rigs, and various other uses. The structure of this engaging unit permits its cooperating parts to function in the desired manner when turned to any angle.

Figs. 1 and 12 illustrate the manual means for control of the position of the motor 1, the track 5, and cooperating parts. The frame 2 of the device is provided with integral upright members 47, which support the frame 29, and the frame 29 pivotally supports the track 28 for the motor frame 25. A rod 44 is positioned horizontally on the machine so that it will have bearings on the upright frame members 47. The rod 44 is bent at one end to form a handle 45. The ends of the track members 28 are projected to form bearings 40, for a horizontally disposed shaft 41. The ends of the shaft 41 are bent to form arms 42, that project through the outer ends of arms 43, and these arms 43 are each anchored at their inner ends to the horizontally disposed rod 44. A coil spring 46 is attached to the rod 41, and to a lower horizontal frame member 48 of the frame 2, so that normally it will hold resiliently the motor 1 and its cooperating parts in an approximately horizontal position. The operator may swing the motor and its track 5 on the pivotal connections 30 by movement of the handle 45.

Operation of the pick-up unit of the mechanism is accomplished by the structure shown in Fig. 11. In this instance, a bracket 34 is anchored to one of the motor frame members 25, and extended under the drum member 32 to form a bearing 35. An arm 36 is pivotally connected to the bearing member 35, and extended to form a bearing for the drum member 32. This arm 36 is extended above the drum 32, and pivotally connected to a handle 37, by means of a link bar 38. One end of the handle 37 is pivotally connected with a bracket which is attached to the other motor frame member 25, by means of a pivot 39. Swinging of the handle 37 in one direction will move the member 32 into driving relation with the wheel 31, and in the other direction, into contact with a brake member 33, which is also carried on the frame of the motor 1.

The open sector of the member 3, in Fig. 8, which is shown without the springs 21, more clearly illustrates the structure of the cam position of the adjacent edges of the sector 13 and the inner periphery of the collar 3. When the sector 13 is in normal relation to the collar portion 3, its projections or cam members 16 project into the openings or grooves 14 of the collar; and the grooves 17 of the sector 13 receive the projections 15 of the collar member 3. It is apparent that when the collar member 3 is rotated a slight distance at the same time the sector 13 is held against rotation, that the members 14 to 17 inclusive will function to cause the sectors to move towards the center of the collar. This action takes place when the collar 3 is rotated in either direction. Each groove 17 of the sectors 13 is provided with an upper and a lower extension 17' which encases the projections 15 of the collar sectors 3 and serves to hold the sectors 13 in the plane of the collar and substantially concentric therewith.

The plan view of the track 5 (Fig. 9), illustrates the relation of the drive pinion 9 thereto. This pinion is positioned so that it will project through an opening that is provided in the member 5 between the two tracks 6' and 7' and into engagement with the teeth 8 of the collar 3.

Referring now to the form of the invention shown in Figs. 13 to 21, inclusive, this is illustrated as applied to joints of pipe, designated generally at P, each having a collar P' at one end to receive a coacting threaded end of a connected pipe section. The lower pipe sections in the well may be grasped by a conventional holding spider H, while the coupled pipe section P is supported by an elevator E engaging just below the collar P' and suspended by a swivel S carried in the usual way in the derrick D. These parts support the pipe section P to be coupled with or uncoupled from the pipe section in the well by the wrench device constituting this form of the invention.

This wrench device is constructed of a base frame 51 having laterally projecting lugs 52 on opposite sides thereof receiving therein upwardly extending rods 53, while a coacting rod 54 is joined to the opposite end of the base frame 51, and is coupled therewith by a ring 55. The rods 53 and 54 thus form a triangular suspending frame for the wrench device for holding the same in proper position for operation. This triangular supporting frame is suspended from the lower end of a cable 56 attached to the ring 55 at one end and having its opposite end attached to an arm 57 pivoted at 58 to the derrick D with a weight 59 connected with the opposite end of said arm sufficiently heavy to counterbalance the weight of the wrench device.

Figure 16:
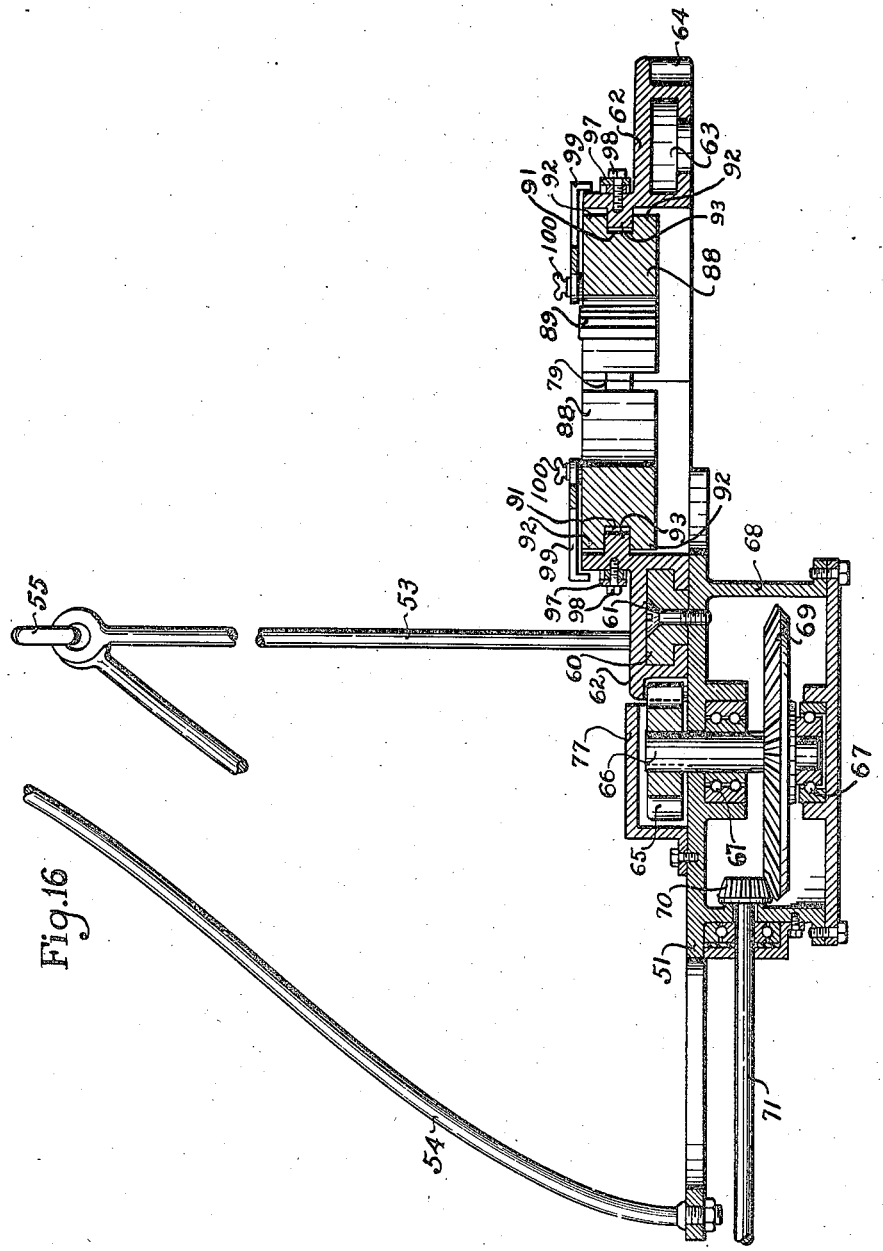
Fig. 16 is a longitudinal sectional view through the wrench device.

The base plate 51 has one end thereof formed of substantially arcuate shape, and about which extends a segmental track 60. This track 60 is constructed of T-shape and is secured on the base plate 51 by screws 61, to support the rotary table on the base plate for turning movement relative thereto, as shown in Figs. 16 and 19.

Figure 17:
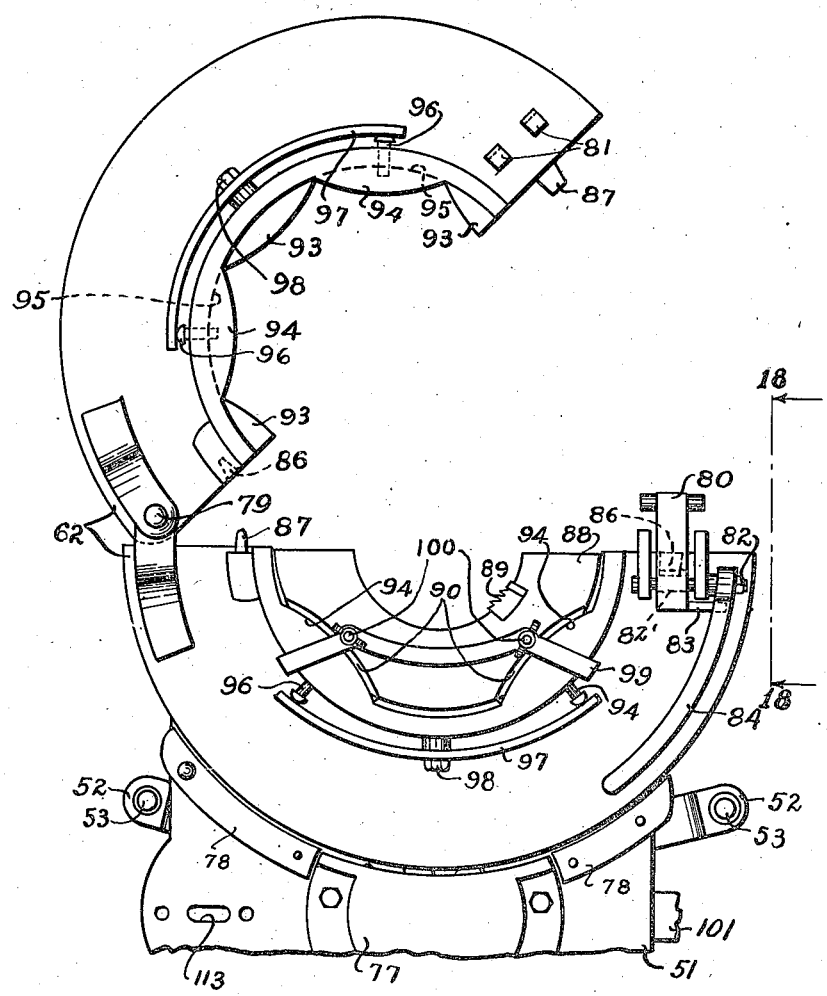
Fig. 17 is a partial top plan view thereof with the rotary table sections open and the segments of one section removed.

The rotary table is constructed of semi-circular sections, designated generally by the numeral 62, which have a groove 63 in the under side thereof receiving and riding on the track 60 to hold the rotary table in place on the base plate 51, but when turned to proper relation thereto, one of the sections 62 may be swung to an open position, as shown in Fig. 17, while the other section remains on the segmental track 60.

The periphery of the sectional rotary table 62 is formed with gear teeth 64 adapted to mesh with a pinion 65 mounted on a stub shaft 66. The stub shaft 66 is journaled in bearings 67 in the base plate 51 and extends into a gear housing 68 where it has mounted thereon an enlarged bevel gear 69. The gear 69 is in mesh with a beveled pinion 70 fixed on a drive shaft 71 extending from the housing 68 lengthwise of the base plate 51 and having universal joints 72 therein (Fig. 13) to accommodate for freedom of swinging movement of the wrench device to different positions relative to the derrick D. The drive shaft 71 is driven by a power unit mounted on the derrick D, said power unit comprising gearing 73 mounted on the derrick and connected by a sprocket chain 74 with a drum 75, which in turn is driven from a suitable source of power by a sprocket chain 76. This mechanism provides for the rotary turning movement of the sectional table 62 in either direction, as may be desired for coupling or disconnecting the pipe joints.

The pinion 65 is enclosed within a gear cover 77 to protect the hands of the workmen from the same and to prevent the mashing thereof between said pinion and the gear teeth 64. Guards 78 preferably of rubber or other resilient material are provided also on opposite sides of the pinion 65 to prevent the hands of workmen from becoming entangled between the gear teeth and pinion, and as a warning thereof before becoming engaged therebetween. The gear 64 is rotated very slowly so that this warning will be sufficient to enable the operator to remove his hand upon engagement with either of the guards 78.

Figure 15:
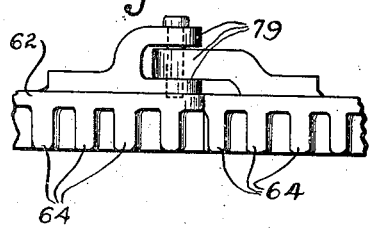
Fig. 15 is a detail side elevation showing the hinge construction of the rotary table, taken substantially on the line 15—15 of Fig. 14.

While the table sections 62 are constructed semi-circular, they may be connected in annular form, for which purpose they are hinged together at one side and have a latch device at the opposite side thereof. The hinge is designated generally at 79 and has the axis thereof slightly offset from the center line of the table sections, as shown in Figs. 14 and 15, to facilitate the relative separation of the sections, as shown in Fig. 17, enabling one section to be swung away from the other when turned to the position shown. The sections are adapted to be secured in closed relation by a latch member 80 of substantially T-shape arranged to engage over lugs 81 on one of the sections, while the latch is journaled on an eccentric 82' fixed on a shaft 82; and said latch member 80 has an offset projection 83 extending laterally in the path of a lever 84 secured to the shaft 82. Thus, when the lever 84 is turned to the position shown in Figs. 17 and 18, it bears down on the projection 83 and lifts the latch 80 out of engagement with the lugs 81, but allows the latch to engage over the lugs when the lever 84 is swung to its opposite position, as shown in Fig. 14.

Figure 18:
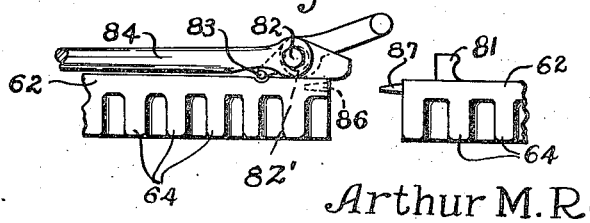
Fig. 18 is a detail side elevation of the latch structure for the rotary table, taken substantially on the line 18—18 of Fig. 17, with the sections partly open.

To provide for proper alignment of the sections, the opposite ends of the respective sections are formed with complementary interengaging recesses 86 and tongues 87, as shown in Figs. 14, 17 and 18.

Each of the rotary table sections 62, has a gripping segment 88 mounted therein and carrying a toothed pipe gripping element 89, as shown in Fig. 14. Each of the segments 88 is constructed substantially as shown in Fig. 21 with peripheral notches 90 and 91 arranged in staggered relation and alternating with arcuate edge portions 92. The corresponding table section 62 has projections 93 and 94 formed on the inner surface thereof in staggered relation and having arcuate inner edges to interfit respectively with the notches 91 and 90 of the segment 88, the arcuate portions 92 on the segment fitting within grooves 95 between the projections 94 of the table section to provide cam action therebetween upon relative rotation of these parts.

The segments 88 fit loosely in the table sections 62, but are urged inward by pins 96 slidably mounted in the sides of the table sections in alignment with the grooves 95, and pressed inward by a leaf spring 97 having its opposite ends bearing against the pins 96 and secured at 98 intermediate its ends to a side of the section 62, as by a bolt or screw. The inward movement of the segments 88 is limited by retaining members 99, the outer ends of which are hooked over peripheral portions of the table sections, while the inner ends are secured to the segments by bolts or screws 100 which are readily removable to permit the segments to be taken out or reversed as desired. This is desirable when the pipe is to be rotated in a reverse direction requiring the reversal of the segments 88 to provide the proper gripping action on the pipe.

In using this device, it is adapted to be suspended in a horizontal position substantially as shown in Fig. 13, in which position it is capable of movement laterally for proper gripping action around the pipe joint P. The table sections 62 may be opened, as shown in Fig. 17, to embrace the pipe joint, and then locked in place therearound by the closing of the latch 80, as shown in Fig. 14. The height of the unit should be adjusted so as to obtain the proper gripping action on the pipe joint which may be varied by raising or lowering the cable 56, from which the bars 53 and 54 are suspended.

When thus applied to the pipe joint in proper gripping relation thereto, the power mechanism is operated to drive the bevel gearing 69—70 and thus rotate the gearing 64—65, turning the rotary table 62. Although the segments 88 are pressed inward by the springs 97 with the gripping elements 89 engaging the pipe joint P, this inward pressing action is increased by the turning movement of the table 62 which tends to have a relative movement to the segments 88, thereby shifting the flange portions 93—94 relative to the grooves or notches 90—91 in the segments, substantially in cam action, thereby forcing the segments into tighter gripping engagement with the pipe joint sufficiently to rotate the joint with the turning movement of the table, as indicated by the arrow in Fig. 14. By reversing the positions of the segments 88 relative to the sectional table, the pipe joint may be turned in the reverse direction for unscrewing from the pipe in the well.

The unit is held against lateral shifting movement during the rotation of the table by cables secured to opposite sides thereof and anchored at desired positions in the derrick D. At one side, the base frame 51 has a lug 101 attached thereto, as shown in Fig. 14, to which one anchoring cable is adapted to be secured. The opposite side of the base 51 has a lug 102 connected with the base 51 by pins 103 extending through slots 104 in the lug for limited sliding movement thereof relative to the base. A cable is shown at 105 connected by a hook 106 to this lug 102, said cable extending laterally to a portion of the derrick to which it is anchored. This slidable movement of the lug 102 makes it possible to determine the degree of torsion applied to the pipe, for which purpose the lug 102 is pivotally connected at 107 with one end of a pointer arm 108 (Figs. 14 and 20), which pointer arm has a slot 109 therein providing a slidable pivotal connection for the pointer on a pin 110 secured to the table 51. The pointer arm 108 extends through a slot 111 in the base 51 and coacts with a graduated scale or indications 112 to indicate the extent of torsion applied to the pipe. This is made possible by the pivot pin 107 extending through a lot 113 in the base 51 with a leaf spring 114 bearing thereagainst in opposed relation to the pull applied to the cable 105. When the pipe is being screwed together, the power applied to the sectional table 62 will tend to cause a lateral movement of the base frame 51 according to the degree of torsion applied to the pipe, which in turn, will move the pivot pin 107 in the slot 113, causing a turning movement of the lever arm 108 about the pin 110, to a degree corresponding with the torsion applied to the pipe, thereby indicating at 112 the extent of turning moment of the pipe.

I claim:

1. Mechanism for handling pipe, and the like, comprising a split collar having sections hinged together with means for holding the same in closed concentric relation, each of said sections carrying a segment mounted therein having means for gripping engagement with a pipe, means forming a plurality of interfitting cam surfaces between each collar section and its segment arranged to force the segment inward in gripping engagement with the pipe upon relative turning movement of the collar in either direction with respect to the segments, said cam means including a plurality of circumferentially aligned grooves and ribs on the segments, and interfitting grooves and ribs on the collar and arranged in cooperating overlapping relation with each other, and means for rotating the collar in either direction.

2. Mechanism for handling pipe, and the like, comprising a split collar having sections hinged together with means for holding the same in closed concentric relation, each of said sections carrying a segment mounted therein having means for gripping engagement with a pipe, means forming a plurality of interfitting cam surfaces between each collar section and its segment arranged to force the segment inward in gripping engagement with the pipe upon relative turning movement of the collar in either direction with respect to the segments, said cam means including a groove in each segment with circumferentially aligned ribs on opposite sides thereof interfitting respectively with a rib and recess circumferentially aligned in the supporting collar section thereof, and means for rotating said collar.

3. In pipe turning mechanism, a collar adapted to surround a pipe, a segment mounted therein and having means for gripping engagement with a pipe, and means forming a plurality of interfitting cam surfaces between said collar and the segment arranged to force the segment inward upon relative turning movement thereof, said cam means including a circumferentially aligned groove and rib on the segment and an interfitting rib and groove on the collar.

4. In pipe turning mechanism, a collar adapted to surround a pipe, a segment mounted therein and having means for gripping engagement with a pipe, and means forming a plurality of interfitting cam surfaces between said collar and the segment arranged to force the segment inward upon relative turning movement thereof, said cam means including a plurality of circumferentially aligned grooves and ribs on the segment and interfitting ribs and grooves on the collar arranged in cooperating overlapping relation with each other.

5. In pipe turning mechanism, a support, an annular collar for surrounding and engaging a pipe to rotate the same, said collar having a side only thereof arranged in horizontal overlapping relation with said support and having the major portion thereof projecting free from said support, and means connected between the overlapping portions of the collar and the support for journaling said collar on the support including a substantially T-shaped track connected with one of said elements and a portion connected with the other of said elements and having a groove therein embracing opposite sides of the head portion of the T-shaped track.

6. In pipe turning mechanism, a support, an annular collar for surrounding and engaging a pipe to rotate the same, said collar having a side only thereof arranged in horizontal overlapping relation with said support and having the major portion thereof projecting free from said support, and means connected between the overlapping portions of the collar and the support for journaling said collar on the support including a substantially T-shaped track connected with one of said elements and a portion connected with the other of said elements and having a groove therein embracing opposite sides of the head portion of the T-shaped track, said collar including segmental sections adapted to be opened to receive the pipe, and the track being arcuate and of shorter circumferential length than one of the sections and suporting the collar thereby when opened.

7. In pipe turning mechanism, a collar adapted to surround a pipe and including an arcuate section, a complementary segment mounted in the section and having means for gripping engagement with a pipe, said section and segment having facing sides with normally opposed curved surfaces approximately concentric with said collar, one of said members having grooves in said facing side thereof curved at the inner edge thereof on a different radius from said curved surfaces, and the other of said members having ribs thereon normally interfitting with said grooves, said interfitting ribs and grooves being spaced apart circumferentially for inward movement of the segment upon turning movement of the collar.

8. In pipe turning mechanism, a collar adapted to surround a pipe and including an arcuate section, a complementary segment mounted in the section and having means for gripping engagement with a pipe, said section and segment having facing sides with normally opposed curved surfaces approximately concentric with said collar, one of said members having grooves in said facing side thereof curved at the inner edge thereof on a different radius from said curved surfaces, and the other of said members having ribs thereon normally interfitting with said grooves, said interfitting ribs and grooves being spaced apart circumferentially on opposite sides of the opposed curved surfaces of said members for inward movement of the segment upon turning movement of the collar in either direction.

9. In pipe turning mechanism, a collar adapted to surround a pipe and including an arcuate section, a complementary segment mounted in the section and having means for gripping engagement with a pipe, said section and segment having facing sides with normally opposed curved surfaces approximately concentric with said collar, one of said members having grooves in said facing side thereof curved at the inner edge thereof on a different radius from said curved sufaces, and the other of said members having ribs thereon normally interfitting with said grooves, and having the peripheral edges thereof curved complementary to said grooves, said interfitting ribs and grooves being spaced apart circumferentially on opposite sides of the opposed curved surfaces of said members for inward movement of the segment upon turning movement of the collar in either direction.

10. In pipe turning mechanism, a collar adapted to surround a pipe and including a section, means for supporting said collar for turning movement, a segment within said section and having means for gripping engagement with a pipe, said section and segment being shaped as complementary arcuate members approximately concentric with said collar with circumferentially spaced arcuate ribs on opposite sides thereof, said member having an arcuate rib thereon vertically aligned with said arcuate surface and of a different radius, and the other member having circumferentially aligned arcuate grooves interfitting with the ribs and complementary thereto and having arcuate surfaces complementary to the arcuate surfaces of the first-mentioned member.

ARTHUR M. ROWLAND.